(12) United States Patent
Koh et al.

(10) Patent No.: US 7,317,394 B2
(45) Date of Patent: Jan. 8, 2008

(54) SYSTEM FOR DEVELOPING AND DEPLOYING RADIO FREQUENCY IDENTIFICATION ENABLED SOFTWARE APPLICATIONS

(75) Inventors: Liang Seng Koh, Fremont, CA (US); Fu-Liang Cho, San Jose, CA (US); Fu-Tong Cho, Milpitas, CA (US); Daniel Fung, Redwood City, CA (US); Hsin Pan, Fremont, CA (US)

(73) Assignee: RFCyber Corp., Fremont, CA (US)

( * ) Notice: Subject to any disclaimer, the term of this patent is extended or adjusted under 35 U.S.C. 154(b) by 513 days.

(21) Appl. No.: 11/029,867

(22) Filed: Jan. 4, 2005

(65) Prior Publication Data

US 2006/0161878 A1    Jul. 20, 2006

(51) Int. Cl.
*G08B 13/14* (2006.01)
(52) U.S. Cl. .................. 340/572.1; 717/120
(58) Field of Classification Search .......... 340/572.1
See application file for complete search history.

(56) References Cited

U.S. PATENT DOCUMENTS 6,988,079 B1 * 1/2006 Or-Bach et al. ........... 705/28
6,995,675 B2 * 2/2006 Curkendall et al. ...... 340/573.3
2001/0050922 A1 * 12/2001 Tiernay et al. .............. 370/467
2002/0158765 A1 * 10/2002 Pape et al. ................. 340/573.3
2006/0109085 A1 * 5/2006 Tiernay et al. ............. 340/10.1
2006/0187048 A1 * 8/2006 Curkendall et al. ...... 340/572.4

* cited by examiner

*Primary Examiner*—Daniel Wu
*Assistant Examiner*—George A. Bugg
(74) *Attorney, Agent, or Firm*—Joe Zheng

(57) ABSTRACT

A system, method and related software architecture are disclosed as a platform for developing and deploying RFID-enabled software applications. The platform is a framework between these applications and their connected physical RFID devices. The runtime version of this platform can be thought of as a logical RFID device. The platform allows RFID-enabled applications securely communicate with physical RFID devices to monitor their status and to access their tag data. The platform includes externalized APIs for accessing tag data, an event manager to alert applications of events coming from RFID devices and tags, data manager to filter and reconcile data returned from physical RFID readers before relaying them to applications, device manager to monitor the RFID device status for network management, and secured communication channels with data encryption. The deployed RFID-enabled applications can recognize user identification via the RFID tags then access data of selected RFID tags within a secured infrastructure.

74 Claims, 8 Drawing Sheets

SYSTEM FOR DEVELOPING AND DEPLOYING RADIO FREQUENCY IDENTIFICATION ENABLED SOFTWARE APPLICATIONS

BACKGROUND OF THE INVENTION

1. Field of the Invention

The present invention relates generally to the field of Radio Frequency IDentification (RFID) technology. More specifically it relates to the development and deployment of RFID-enabled software applications in a networked computer environment.

2. Description of the Related Art

With its numerous potential advantages of low cost, convenience, flexibility and massive scalability from deployment through operation, the RFID technology is enjoying tremendous growth of acceptance across a wide spectrum of industries.

To enable product integration into real-world RFID application systems, currently some RFID hardware vendors provide basic libraries or command sets as an interface/vehicle for their RFID readers or devices to interact with the anticipated application systems. However, for most cases these basic libraries or command sets only support low level APIs (Application Programming Interfaces). As these low level APIs handle a single task at a time, it normally takes a logically structured sequence of these low level APIs to perform a useful application level task. For instance, reading a data block at the application level may require a programmer to resolve anti-collision, to select an RFID tag and to access data stored on the selected RFID tag. Furthermore, as these low level APIs can vary greatly according to the specifics of RFID vendor hardware (e.g., vendor-specific RFID readers/writers and tags), application system programmers usually will have to relearn associated programming specifics whenever a different RFID vendor device has to be dealt with. As a result, the RFID application development process becomes correspondingly costly and time consuming while yielding systems that are typically non-portable. To make matters even worse, the actual deployment and operational evolution of many RFID application systems commonly encounter different kinds of vendor-specific physical RFID readers, writers and tags, or heterogeneous physical RFID devices and tags. Another phenomenon is that many of the currently deployed RFID applications are limited to desktop applications not yet in pace with the rapidly and continuously expanding base of network-coupled applications including the wireless environment wherein communication security can be critical. A list of relevant references is provided in APPENDIX-I and some of them are briefly discussed below.

Reference 12 (U.S. Pat. No. 6,768,419) and Reference 28 (US application #20040201479) entitled "Applications for radio frequency identification systems" describe the work flow of RFID applications associated with RFID devices and tags. In contrast, the present invention provides a system and method for efficiently developing and deploying RFID applications instead of the behavior of those RFID applications themselves.

Reference 9 (U.S. Pat. No. 6,714,121), entitled "RFID material tracking method and apparatus", describes a system for automatically tracking items via RFID passive tags. It focuses on a mechanism to track massive RFID passive tags by using remote sensing antennas and RFID devices. On the other hand, our invention provides a system to help developing RFID software applications.

References 29 (US application #20040220897 entitled "System, method, and computer software product for instrument control and data acquisition, analysis, management and storage") and 30 (US application #20040254840 entitled "Parking reservation systems and related methods") each describes systems and methods to realize a particular RFID application. Detailed work flow and behavior of the application are presented to resolve problems encountered in a specific application domain. Hence, they are both different from our invention which provides a system to help developing and deploying general RFID software applications.

GLOSSARY

| | |
|---|---|
| AES | Advanced Encryption Standard |
| API | Application Programming Interface |
| DES | Data Encryption Standard |
| HTML | HyperText Markup Language |
| HTTPS | HyperText Transmission Protocol over Secure Socket Layer |
| POST | A method of HTML to form data appearing in a message body |
| RF | Radio Frequency |
| RFID | Radio Frequency Identification |
| SNMP | Simple Network Management Protocols |
| SDK | Software Development Kit |
| ThML | Theological Markup Language |
| RFID-SDK | RFID-Software Development Kit |
| RFID-WSK | RFID-Web Service Kit |
| VML | Vector Markup language |
| VRML | Virtual Reality Markup Language |
| Wi-Fi | Wireless Fidelity, a wireless networking protocol |
| XML | Extensible Markup Language |

SUMMARY OF INVENTION

To make the development, deployment and operational evolution of many RFID-enabled application systems more efficient, less costly and more portable, there is a need of a unified platform containing network management for all connected physical RFID devices, data management for processing raw data returned from the physical RFID readers before sending valid data back to the RFID-enabled applications and secured communication channels carrying information of tag data and RFID devices. To keep pace with the rapidly and continuously expanding base of network-coupled applications, it is also important that the unified platform supports the development and deployment of RFID-enabled web and network applications. A system is disclosed for efficiently developing and deploying physically individually located RFID-enabled software applications, including handheld, desktop, networked and web applications. The system can securely monitor the status of and communicate with network-coupled, heterogeneous physical RFID devices to access data stored on scanned RFID tags, the system comprises:

An RFID-Software Development Kit (RFID-SDK) that comprises externalized device-independent RFID-enabling APIs (Application Programming Interfaces). During run time, these APIs are invokable by the RFID-enabled software applications for accessing the RFID tag data.

A number of logical RFID devices each coupled with the RFID-enabled software applications through some of the externalized device-independent RFID-enabling APIs. Concurrently, the logical RFID devices are also coupled with the physical RFID devices through a set of device-dependent interfaces for securely bridging the communication between the RFID-enabled software applications and the heterogeneous physical RFID devices to access the RFID tag data.

The system further comprises the following:

A device monitor and manager that is a device manager service daemon running inside the logical RFID devices for monitoring and controlling the physical RFID devices and the logical RFID devices in real-time.

A data monitor and manager coupled to the logical RFID devices for monitoring and managing data flow between the RFID-enabled software applications and the physical RFID devices.

To monitor and control the physical RFID devices and the logical RFID devices, the device monitor and manager further comprises a set of externalized device monitoring and controlling commands and APIs.

The RFID-SDK further comprises a set of ActiveX components or a set of web plug-in components for a web browser and an RFID Web Service Kit (RFID-WSK) that in turn includes the following:

A set of web script APIs, such as JavaScript APIs, for scripting web client pages.

A set of server-resident services called web objects, such as servlets.

A set of data objects, including XML data objects, represented in web page markup languages such as Extensible Markup Language (XML), HyperText Markup Language (HTML), Standard Generalized Markup Language (SGML), Vector Markup language (VML), Theological Markup Language (ThML) and Virtual Reality Markup Language (VRML).

The externalized device-independent RFID-enabling APIs according to the invention comprise:

command-APIs for effecting an interaction between the RFID-enabled software applications and the logical RFID devices.

callback-APIs, each of which is a callback registration, for registering events coming from the interior of the logical RFID devices.

plug-in services, each of which is a catcher of events coming from the interior of the logical RFID devices, for registering and invocating application plug-ins.

An application development tools set for developing runtime invokable client components by the RFID-enabled software applications for accessing the RFID tag data.

To increase the flexibility of application programming, the command-APIs are designed to support a number of programming languages such as C++, C, C#, Visual Basic, Java, and JavaScript. Likewise, the callback-APIs are also designed to support a number of programming languages such as C++, C, C#, and Java.

Each of the logical RFID devices further includes a logical RFID device runtime daemon for communicating with the device-independent RFID-enabling APIs and for providing the device-dependent interfaces.

For communication with the device-independent RFID-enabling APIs, the logical RFID device runtime daemon further comprises the following to insure an end-to-end secured communication between the physically individually located RFID-enabled software applications and the physical RFID devices:

A command-APIs listener, together with a coupled secured control channel and a coupled secured data channel, for providing bi-directional communication channels and maintaining information flow between the logical RFID device and each of those device-independent RFID-enabling APIs that is a command-API.

An event dispatcher, together with an optional, coupled secured event notification channel, for establishing event notification channels and managing event flow between the logical RFID device and each of those device-independent RFID-enabling APIs that is either a callback-API or a plug-in service.

The control channel, data channel and event notification channel are all secured through data encryption implemented with symmetric algorithms, such as Advanced Encryption Standard (AES), DES (Data Encryption Standard), triple-DES, RC2, RC4, RC5, Blowfish, SAFER, SEAL, or WAKE, with dynamic generated keys.

For providing the device-dependent interfaces, the logical RFID device runtime daemon further comprises the following:

A device interface manager for handling and converting device-dependent communication protocols associated with each of the device-dependent interfaces into a device-independent interface for controlling and accessing data from the physical RFID devices. The device-dependent communication protocols include wired and wireless communication protocols such as RS232, RS422, USB, Wi-Fi and Bluetooth.

An adaptor manager, coupled with the device interface manager through the device-independent interface, for concurrently handling the operation of all connected physical RFID devices.

For concurrently handling all connected physical RFID devices, the adaptor manager further comprises the following:

An adaptor-type definer for defining an adaptor type for each kind of physical RFID devices according to its unique set of communication attributes and service attributes. The set of communication attributes includes communication protocol and port number. The service attributes include parameters related to the functionally of the logical RFID device runtime daemon such as the length of each polling cycle to read RFID tag data within an RF scan field, the time duration after a last scanned RFID tag for ending a polling cycle, the time interval between consecutive polling cycles, the anti-collision index of a physical RFID device, the data length of each read operation upon a scanned RFID tag and the type of events triggering a polling operation.

An adaptor constructor for creating one adaptor instance for each connected physical RFID device.

An adaptor controller for concurrently monitoring and controlling the operational status of all connected physical RFID devices through their respective adaptor instances.

The adaptor manager further comprises an adaptor cluster for grouping a number of adaptor instances according to a set of clustering parameters such as physical proximity of the physical RFID devices, identify of RF scanning fields of the physical RFID devices, location of the physical RFID devices, mission of the physical RFID devices and load balancing of objects being scanned by the physical RFID devices.

For filtering the RFID tags data read from each set of grouped adaptor instances, the logical RFID device runtime daemon further comprises a tag data processing manager, coupled with the adaptor manager, the command-APIs listener and the event dispatcher. The tag data processing manager functions to eliminate duplicated RFID tags data retrieved from the same RFID tag, to clean up unexpected RFID tags data, to aggregate RFID tags data to fulfill a corresponding requirement from the RFID-enabled software applications and to deliver commands and data originated from the RFID-enabled software applications to targeted adaptor instances of the adaptor manager.

The device monitor and manager further comprises the following:

A set of commands and externalized device management APIs for monitoring, via control channels, the status, performance tune up and device specific parameters of the physical RFID devices using standard network management protocols such as SNMP.

A set of externalized event management APIs for notifying the RFID-enabled software applications of predefined events coming from the physical RFID devices.

The data monitor and manager further comprises the following:

A set of externalized data access APIs usable by the RFID-enabled software applications for accessing the RFID tags data.

A set of externalized data management APIs for filtering and reconciling the RFID tags data from the physical RFID devices before sending a resulting valid data to the RFID-enabled software applications.

A tag administration tool for initializing inserted new RFID tags and keeping track of the status all initialized tags.

The proposed system can be implemented on a personal computing machine, an industrial computing machine or an embedded system box containing all software platform functionality as well as computing and networking capability.

Other details and advantages of the present invention will become obvious to the reader and it is intended that these details and advantages be within the scope of the present invention.

To the accomplishment of the above and related objects, this invention may be embodied in the form illustrated in the accompanying drawings, attention being called to the fact, however, that the drawings are illustrative only, and that changes may be made in the specific construction illustrated.

BRIEF DESCRIPTION OF THE DRAWINGS

Various other objects, features and attendant advantages of the present invention will become fully appreciated as the same becomes better understood when considered in conjunction with the accompanying drawings, in which like reference characters designate the same or similar parts throughout the several views, and wherein.

DETAILED DESCRIPTION OF THE PREFERRED EMBODIMENTS

In the following detailed description of the present invention, numerous specific details are set forth in order to provide a thorough understanding of the present invention. However, it will become obvious to those skilled in the art that the present invention may be practiced without these specific details. In other instances, well known methods, procedures, components, and circuitry have not been described in detail to avoid unnecessary obscuring aspects of the present invention. The detailed description is presented largely in terms of logic blocks and other symbolic representations that directly or indirectly resemble the related software operations. These descriptions and representations are the means used by those experienced or skilled in the art to concisely and most effectively convey the substance of their work to others skilled in the art.

Reference herein to "one embodiment" or an "embodiment" means that a particular feature, structure, or characteristics described in connection with the embodiment can be included in at least one embodiment of the invention. The appearances of the phrase "in one embodiment" in various places in the specification are not necessarily all referring to the same embodiment, nor are separate or alternative embodiments mutually exclusive of other embodiments. Further, the order of blocks in process flowcharts or diagrams representing one or more embodiments of the invention do not inherently indicate any particular order nor imply any limitations of the invention.

Figure 1:
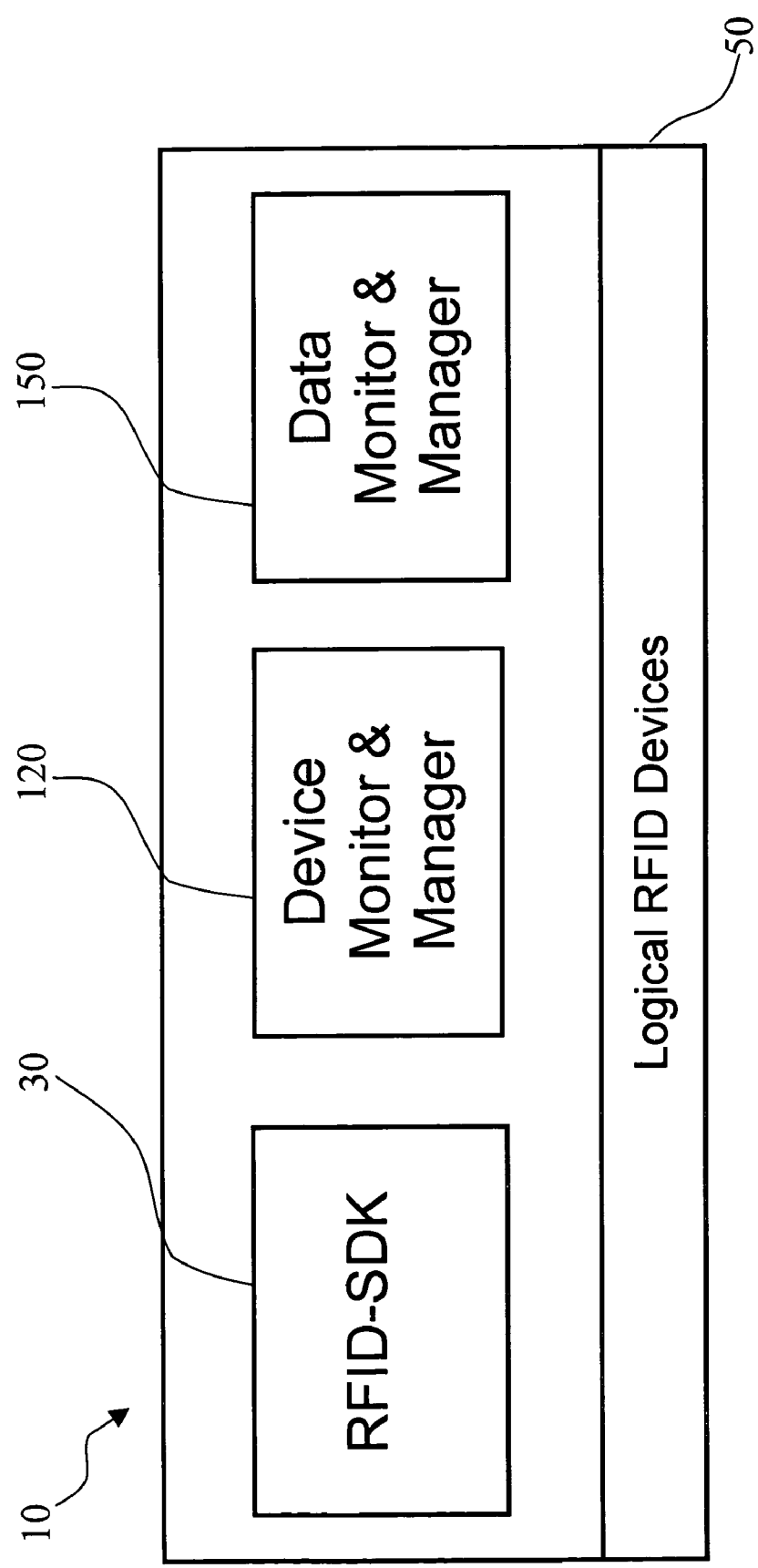
FIG. 1 diagrammatically illustrates the major high level components of an RFID-enabled application development and deployment system of the present invention.

FIG. 1 illustrates the major high level components of the RFID-enabled application development and deployment system 10 of the present invention. More detailed descriptions of these high level components will be presently described in FIG. 3. The RFID-enabled application development and deployment system 10, alternatively termed RFCyberWork, is a platform for developing and deploying RFID-enabled desktop, networked and web applications. The RFID-enabled application development and deployment system 10 comprises an RFID-Software Development Kit (RFID-SDK) 30, logical RFID devices 50, a device monitor and manager 120 and a data monitor and manager 150.

The RFID-SDK 30 comprises a set of externalized APIs, an event notification mechanism and a set of application development tools such as a web enabled tool kit called RFID Web Service Kit (RFID-WSK). The terminology "externalized APIs" refers to APIs that are used by RFID application developers to write RFID-enabled software applications and that are run-time invokable by a requesting RFID-enabled software application for accessing RFID tag data of a physical RFID device. Here, accessing means performing a read or write operation onto the RFID tag. For flexibility of application development, the externalized APIs are designed to support a wide variety of programming languages such as C++, C, C#, Java, Visual Basic and JavaScript. It is important to point out that these externalized APIs are device-independent. The following are some examples of these externalized device-independent APIs which are independent of the interface specifics of their connected heterogeneous physical RFID devices. As such, these externalized device-independent APIs do not have parameters for defining specific features of each heterogeneous physical RFID device:

RFCReader::getTagAllId(RFCTagUID*& tag, short& numTags);

RFCApplication::getBlockData(const RFCTagUID& tag, unsigned char*& data, int& dataLength, short startBlock=1, short numOfBlocks=1, unsigned char* AESKey=NULL);

RFCApplication::setBlockData(const RFCTagUID& tag, unsigned char* data, int dataLength, short startBlock=1, short numOfBlocks=1, unsigned char* AESKey=NULL);

The externalized device-independent class RFCReader functions to get information of RFID tags detected by any connected physical RFID devices. The class RFCApplication functions to access application data, that are data blocks only, of a given RFID tag.

public int RFCReader::getAllTagId(RFCTagUID*& tag, short& numTags); Get all tags detected by the reader.

Parameters:

tag—OUT, an RFCTagUID pointer to get information of all returned RFCTagUID objects stored in an array.
The caller function must call freeMemory (RFCTagUID*), i.e.,freeMemory(tag);, after usage to avoid memory leakage.

numTags—OUT, number of RFCTagUID objects in the array pointed by "tag".

Returns:

result code, defined in rfc_define.h public int RFCApplication::getBlockData(const RFCTagUID& tag, unsigned char*& data, int& dataLength, short startBlock=1, short numOfBlocks=1, unsigned char* AESKey=NULL);

Get value of a number of specified data blocks in a given tag.
Use methods getResultCodeLength( ), getResultCode(int), and getResultCodeAddr(int), which are defined in super class RFCBase, to retrieve results of access operation against each block.

Parameters:

tag—IN, the given tag.

startBlock—IN, starting data block number which is block address id for Non-MAD and block offset for MAD.
Non-MAD: accessible block address id, e.g., one of (0,1,2;4,5,6;8,9,10;12,13,14; . . . ; 56,57,58;60,61,62) for Mifare 1K.

numOfBlocks—IN, number of data blocks to be retrieved starting from startBlock. Default value is 1. Max value is 48 for Mifare 1K.

AESKey—IN, 16 byte unsigned character string as input key for AES algorithm to decrypt the value in the specified data blocks. Default value is NULL, i.e., no data encryption in the specified data blocks.

data—OUT, an "unsigned char" pointer to get information of all returned data block.
The caller function must call freeMemory(unsigned char*), i.e., freeMemory(data);, after usage to avoid memory leakage.

dataLength—OUT, number of data blocks in the buffer pointed by "data".

Returns:

result code, defined in rfc_define.h public int RFCApplication::setBlockData(const RFCTagUID& tag, unsigned char* data, int dataLength, short startBlock=1, short numOfBlocks=1, unsigned char* AESKey=NULL);

Set given data into a number of specified data blocks in a given tag.
If length of the given data exceeds length of data blocks in the tag, those extra given data are truncated. On the contrary, extra data blocks in the tag are padded with 0.
Use methods getResultCodeLength( ), getResultCode(int), and getResultCodeAddr(int), which are defined in super class RFCBase, to retrieve results of access operation against each block.

Parameters:

tag—IN, the given tag.

startBlock—IN, starting data block number which is block address id for Non-MAD and block offset for MAD.
Non-MAD: accessible block address id, e.g., one of (1,2;4,5,6;8,9,10;12,13,14; . . . ; 56,57,58;60,61,62) for Mifare 1K.

numOfBlocks—IN, number of data blocks to be retrieved starting from startBlock. Default value is 1. Max value is 47 for Mifare 1K.

data—IN, the given data, a buffer pointed by "unsigned char", to be written into the given tag.

dataLength—IN, number of data blocks in the array pointed by "data".

AESKey—IN, 16 byte unsigned character string as input key for AES algorithm to encrypt the value in the specified data blocks. Default value is NULL, i.e., no encryption for the given data.

Returns:

result code, defined in rfc_define.h

The event notification mechanism comprises callback APIs and plug-in services. The RFID-WSK comprises a set of JavaScript APIs for scripting web client pages, a set of web objects such as servlets each being a server-resident service, XML data objects as well as ActiveXs and web plug-in components for a web browser. Examples of the server-resident services comprise one or more of the following:

Servlets for dispatching requests from each web client page.

Servlets for calling web plug-in components and ActiveXs provided by users to get application specific information for next step operations.

Servlets for preparing encrypted request packets to be sent to a web client to get RFID tag data from a client site.

Servlets for processing encrypted result packets returned from a web client.

Servlets for calling plug-in components provided by users for applying application specific logic to prepare a returned object.

Servlets for returning a final result back to a web client.

RFID applications can use those utilities to access (read/write) tag data via data, control, and event communication channels.

The logical RFID devices 50 are key software components that enable and coordinate all plug-and-play operations of all heterogeneous physical RFID devices connected to the RFID-enabled application development and deployment system 10. A logical RFID device runtime daemon, being part of the logical RFID devices 50, functions to provide real-time service between the heterogeneous physical RFID devices and other components of the RFID-enabled application development and deployment system 10. Additionally, the logical RFID devices 50 also supports tag data filtering and grouping capability such as data duplication, data cleanup and data aggregation according to sub-grouped physical RFID devices, if any.

The device monitor and manager 120 is a device manager service daemon that monitors, manages and controls, in real-time, all connected physical RFID devices as well as predefined logical RFID devices 50. The monitored and managed information comprises the status, performance tune up and device specific parameters of the physical RFID devices within a network management environment. Therefore, a corresponding set of commands and externalized device management APIs is provided for device monitoring and management via control channels. Standard network management protocols such as Simple Network Management Protocols (SNMP) are supported by the device monitor and manager 120 for the network management. The device monitor and manager 120 also comprise a set of externalized event management APIs for notifying RFID-enabled software applications of predefined events coming from the physical RFID devices.

The data monitor and manager 150 is coupled to the logical RFID devices 50 and the data monitor and manager 150 monitors and manages the flow of data between RFID-enabled applications and the physical RFID devices. The data monitor and manager 150 comprise the following components:

Plug-in services and templates that are hooks to implement those RFID-enabled software application logic specific for data filtering and aggregation.

A data-flow tracker for keeping track of the flow of data between RFID-enabled software applications and all connected physical RFID devices through selected RFID tags within their RF scan fields.

A data-flow analyzer for analyzing those data flow between RFID-enabled software applications and all connected physical RFID devices through selected RFID tags within their RF scan fields for data mining.

A tag administration tool is also included here to initialize inserted new RFID tags and to keep track of all issued tags.

Figure 2:
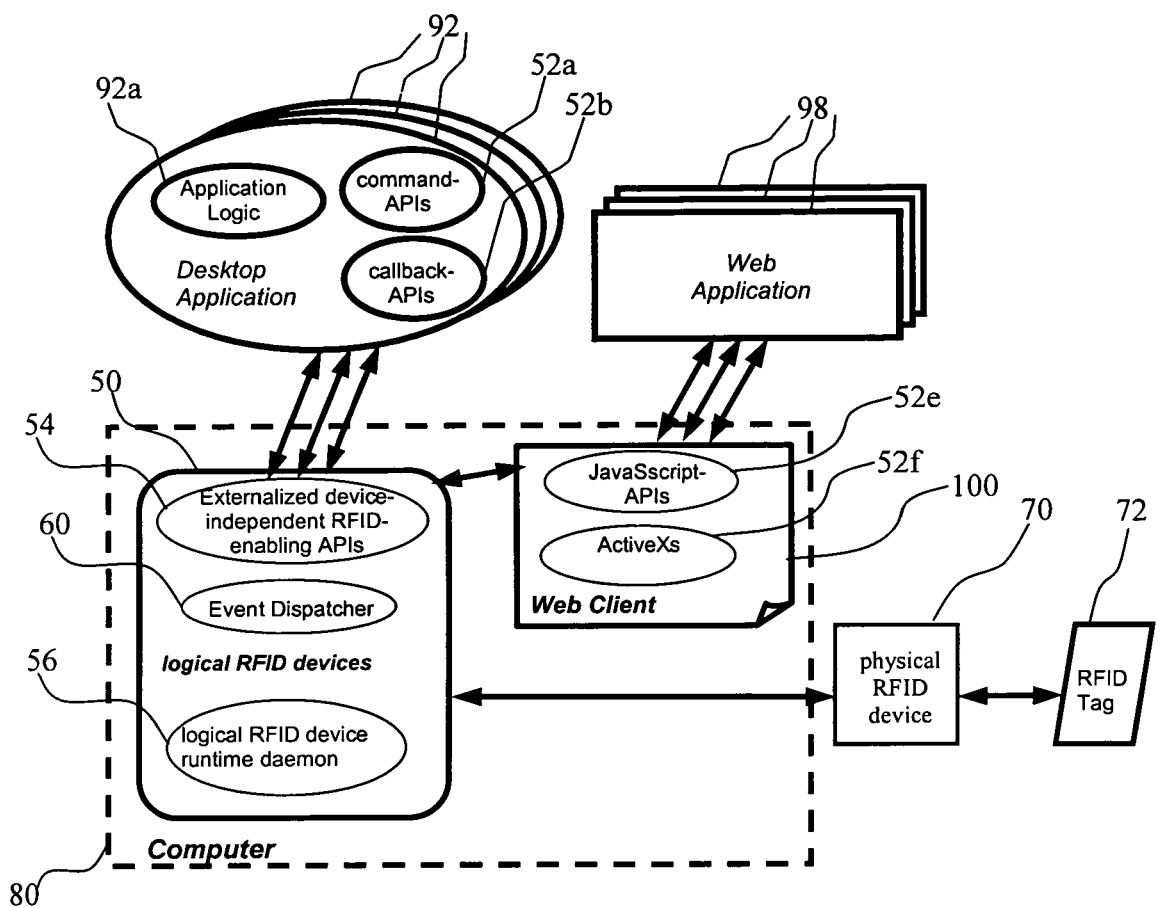
FIG. 2 is a diagrammatic illustration of the major components of the RFID-enabled application development and deployment system in one embodied deployment on a personal computer.

FIG. 2 illustrates the overall relationship of interaction among a physical RFID tag 72, a physical RFID device 70, RFID-enabled applications such as desktop application 92 and web application 98 and major components of the RFID-enabled application development and deployment system 10 in a typical deployed environment. The illustrated major components of the RFID-enabled application development and deployment system 10 comprise logical RFID devices 50 plus a set of command-APIs 52*a* and callback-APIs 52*b* embedded in desktop application 92 plus a set of Javascript-APIs 52*e* and ActiveXs 52*f* embedded in a web client 100 residing in a computer 80. For illustration, the desktop application 92 comprises its own application logic 92*a*. In turn, the web client 100 interacts, through a computer network or Internet, with a web application 98. Likewise, the logical RFID devices 50 interacts, through a computer network or Internet, with a physical RFID device 70 to access data to and from its attached RFID tag 72. Within the logical RFID devices 50 are illustrated functional components externalized device-independent RFID-enabling APIs 54, logical RFID device runtime daemon 56 and event dispatcher 60. In this embodiment, the logical RFID devices 50 is a piece of software installed on a computer 80 that has one or multiple physical RFID devices such as the physical RFID device 70 connected to it. For those skilled in the art, the logical RFID devices 50 can alternatively be installed on an embedded system box.

Figure 3:
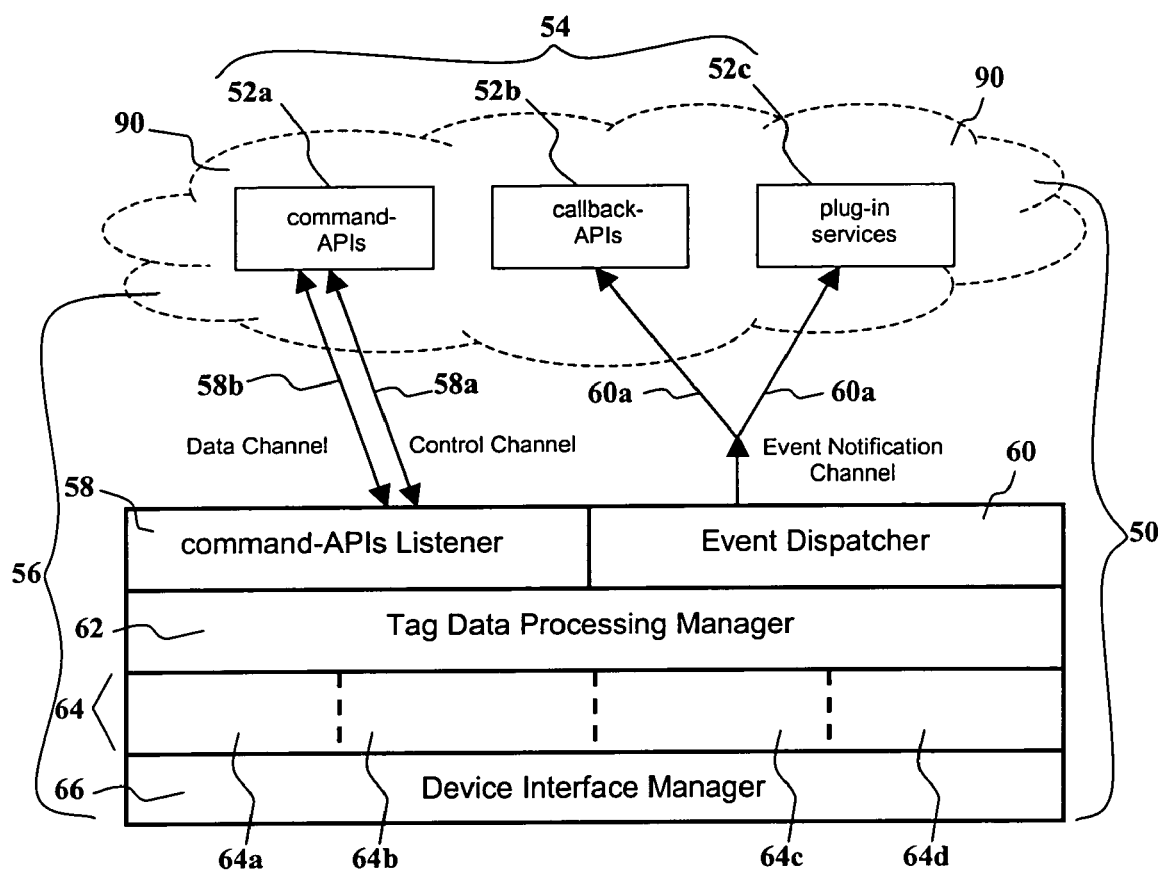
FIG. 3 illustrates the key architectural hierarchy of the RFID-enabled application development and deployment system.

FIG. 3 illustrates the key architectural hierarchy of the RFID-enabled application development and deployment system 10. Notice that the cloud area represents RFID-enabled software applications 90 that in turn embed externalized device-independent RFID-enabling APIs 54 like command-APIs 52*a*, callback-APIs 52*b* and plug-in services 52*c* and, while not shown here to avoid obscuring details, a set of application development tools for developing client components that are run time invokable by the RFID-enabled software applications 90 for accessing the RFID tag data. In addition to the externalized device-independent RFID-enabling APIs 54, the architecture of the logical RFID devices 50 further comprises the following major components:

A device interface manager 66 that interfaces, at the software level, with the physical RFID device 70. The device interface manager 66 handles and converts both wired and wireless device-dependent communication protocols, such as RS232, RS422, USB, Wi-Fi and Bluetooth, associated with each of the device-dependent interfaces of the physical RFID device 70 into a set of device-independent functional interfaces for an upper layer software to control and access data from the physical RFID device 70. Thus, details of these low level device-dependent communication protocols are made transparent to any upper layer software. Concurrently, an upper layer software, after composing data into corresponding device-independent commands, can send these device-independent commands via the device interface manager 66 to control or access data of the physical RFID device 70. As a result, the heterogeneous nature of the device-dependent communication protocols for physical RFID devices from various manufacturers gets hidden from the upper layer software of the RFID-enabled application development and deployment system 10. The following TABLE-I illustrates a specific embodiment of a set of device independent interfaces, with their functional definition written in C++ language, designed to handle those device-dependent interfaces required by various heterogeneous physical RFID devices:

TABLE-I

Device Independent Interface Set for Handling Various Heterogeneous Physical RFID Devices

| Function Definition | Function Description |
|---|---|
| bool initReader( ) | Initialize a reader. It includes to open a hardware interface and to initialize the reader. |
| bool stopReader( ) | Stop a reader. It includes to close a hardware interface and to shutdown the reader. |
| bool resetReader( ) | Reset the hardware interface and reader. |

TABLE-I-continued

Device Independent Interface Set for Handling Various
Heterogeneous Physical RFID Devices

| Function Definition | Function Description |
| --- | --- |
| bool pollTag( ) | Start a polling cycle and generate data events for all scanned tags. |
| int getTagId(TagUID& tagId) | Get any tag currently in the reader's RF field. |
| int getAllTagId(TagUID*& list) | Get all tags currently in the reader's RF field. |
| int suspendPoll( ) | Suspend polling activity. |
| int resumePoll( ) | Resume polling activity. |
| int setBlockData( const TagUID &tag, short startBlock, short numOfBlocks, unsigned char *data, int dataLength, int* resultList) | Write a number of data block to a targeted tag at a starting offset. |
| int setBlockData(const TagUID &tag, short appOrSectorId, AuthKeyMode appKeyMode, const unsigned char* appKey, short startBlock, short numOfBlocks, unsigned char *data, int dataLength, AuthKeyMode dirReadKeyMode, const unsigned char* dirReadKey, int* resultList) | Write a number of data block to a targeted tag at a starting offset computed from an application ID or a sector ID. |
| int getBlockData( const TagUID &tag, short startBlock, short numOfBlocks, unsigned char *&data, int &dataLength, int* resultList) | Read a number of data block from a targeted tag at a starting offset. |
| int getBlockData(const TagUID &tag, short appOrSectorId, AuthKeyMode appKeyMode, const unsigned char* appKey, short startBlock, short numOfBlocks, unsigned char *&data, int &dataLength, AuthKeyMode dirReadKeyMode, const unsigned char* dirReadKey, int* resultList) | Read a number of data block from a targeted tag at a starting offset offset computed from an application ID or a sector ID. |

Furthermore, detailed description of two selected functions setBlockData( ) and getBlockData( ) follows. Two different kinds of physical RFID devices, Escort Memory System LRP-series RFID reader with ABx format commands and Accu-sort Sentient RFR RFID reader with W format commands, are used as vendor-specific examples. As a further reference, the following are addresses of these two vendors:

Escort Memory Systems
170 Technology Circle, Scotts Valley, Calif. 95066
http://www.ems-rfid.com
Accu-Sort Systems, Inc.
511 School House Road, Telford, Pa. 18969
http://www.accusort.com The internal ReaderImpl class is a class that implements various methods for handling generic application logic needed to provide common operations. For many physical RFID readers, the command for each of these operations is mainly different in terms of their instructional format. For instance,

```
int setBlockData(
    const TagUID &tag,      //in: targeted tag
    short startBlock,       //in: starting block address
    short numOfBlocks,      //in: number of blocks to write
    unsigned char *data,    //in: input data buffer
```

-continued

```
    int dataLength,         //in: length of data buffer
    int* resultList)        //out: list of result code
```

This operation writes data from a given buffer to a number of blocks starting from an offset. The logic is as follows:
  To select the tag
  To form the write instruction in base format
  Repeat for a number of blocks
    Fill in the correct offset and data for the command
    Send it to the reader
    Wait for the reader to return
    Assign result status to result code list
To implement this operation using Escort Memory Systems' LRP-Series long range passive RFID readers such as LRP2000 or LRP820, ABx command 0x06 can be used:

| header | packet size | 0x06 | start address | no. of bytes | timeout | data | checksum | terminator |

However, for an Accu-sort Sentient RFR RFID reader, the following W command can be used to write a page:
Wyy<blk-a><blk-b><end> where <end> represents 2 bytes 0x0D, 0x0A, and y is a ASCII numeric digit for the page offset. <blk-a> is an 8 bytes data for page a, <blk-b> is an 8 bytes data for subsequent page (It is ignored).

```
int getBlockData(
    const TagUID &tag,     //in: targeted tag
    short startBlock,      //in: starting block address
    short numOfBlocks,     //in: number of blocks to be read
```

-continued

```
unsigned char *&data,    //out: buffer pointer to store return data
int &dataLength,         //out: length of the data buffer
int* resultList)         //out: list for result codes
```

This operation reads a number of blocks into a given buffer from a starting offset address. The logic is as follows:
  Prepare a buffer
  To select the tag
  To form the read instruction in base format
  Repeat for a number of read blocks
    Fill in the correct offset and data for the command
    Send it to the reader
    Wait for the reader to return
    Assign result status to result code list
  To implement this operation using Escort Memory Systems' LRP-Series long range passive RFID readers such as LRP2000 or LRP820, the ABX command 0x05 can be used. It has the following format:

| header | packet size | 0x05 | start address | no. of bytes | timeout | checksum | terminator |
|--------|-------------|------|---------------|--------------|---------|----------|------------|

However, for an Accu-sort Sentient RFR RFID reader, the following R00 command (9 bytes) can be used to read a page:
R00aazz<end> where <end> represents 2 bytes 0x0D, 0x0A, and an 'a' (or an 'z') represents an ASCII numeric digit.

For concurrently handling the operation of all connected physical RFID devices, the RFID-enabled application development and deployment system 10 will define one adaptor type for each kind of physical RFID device 70 and provide an adaptor manager 64, a component of the logical RFID devices 50, that is coupled with the above device interface manager 66 during application deployment to handle all different adaptor types encountered. More specifically, the adaptor type is defined with an associated set of service attributes and communication attributes part of which are functional parameters for the device interface manager 66. Examples of the service attributes are the following parameters related to the functionally of the logical RFID device runtime daemon 56:

The length of each polling cycle to read RFID tag data within an RF scan field.
The time duration after a last scanned RFID tag for ending a polling cycle.
The time interval between consecutive polling cycles.
The anti-collision index of a physical RFID device.
The data length of each read operation upon a scanned RFID tag.
The type of events triggering a polling operation.

Examples of the communication attributes are communication protocol and port number. Hence, an adaptor-type definer 64a, being a component of the adaptor manager 64, is created to define an adaptor type for each kind of physical RFID device 70. Next, another component adaptor constructor 64b is created for creating, corresponding to each connected physical RFID device 70, one adaptor instance. As a result, two adaptor instances thus created can be of the same adaptor type while possessing different values of service attributes and communication attributes. Also, within the context of the same adaptor instance duplicated data collected from its corresponding physical RFID device 70 within a given time frame can be eliminated. Adaptor-type definer 64a and adaptor constructor 64b should be designed according to features and specifications of the physical RFID devices to facilitate their control and monitoring. Thirdly, another component, called adaptor controller 64c, is provided for concurrently monitoring and controlling the operational status of all connected physical RFID devices through their respective adaptor instances. Yet another component of the adaptor manager 64 is an adaptor cluster 64d for grouping and/or defining a hierarchical structure for a set of adaptor instances according to a set of clustering parameters. The clustering parameters can comprise one or more of the following: physical proximity of the physical RFID devices, identify of RF scanning fields from the same physical RFID device, location of the physical RFID devices, mission of the physical RFID devices and load balancing of objects being scanned by the physical RFID devices. One example of locational clustering of the physical RFID devices is when they are placed in the same building. Some examples of mission of the physical RFID devices are logistics, retailing, supplying and manufacturing. This grouping capability is very important for a tag data processing manager of the logical RFID device runtime daemon 56 to be presently described.

Another major component of the logical RFID devices 50 is a tag data processing manager 62 responsible for filtering the RFID tags data read from each set of grouped adaptor instances through the adaptor manager 64. The data filtering task comprises:

Eliminating duplicated RFID tags data retrieved from the same RFID tag.
Cleaning up unexpected RFID tags data.
Aggregating RFID tags data to fulfill a corresponding requirement coming from the RFID-enabled software applications 90.

As a basic task, the tag data processing manager 62 will also deliver commands and data originated from the RFID-enabled software applications 90 to targeted groups of adaptor instances of the adaptor manager 64.

The command-APIs listener 58 and event dispatcher 60, which are software components in the same layer of the logical RFID devices 50, handle bi-directional communication between main process of the logical RFID devices 50 and those RFID-enabled software applications 90 which use command-APIs 52a, callback-APIs 52b or plug-in services 52c. In case of command-APIs 52a, the listener component command-APIs listener 58 will relay information flow, via a coupling secured control channel 58a and a coupling secured data channel 58b, between the RFID-enabled software applications 90 and the logical RFID devices 50 main process. The secured control channel 58a and secured data channel 58b are compulsory channels required to be established between logical RFID devices 50 and each of their clients. They are bi-directional channels for transporting requests and results of RFC-APIs 52a, including operations against both RFID tags and adaptors. However, in cases of callback-APIs 52b or plug-in services 52c, the event dispatcher 60 would be required for the corresponding information flow, via an optional coupling secured event notification channel 60a, because an event driven message passing mechanism is used between the RFID-enabled software applications 90 and the logical RFID devices 50 main process for events of large data volume. The secured event notification channel 60a dispatches data of RFID tag retrieved from an RF scanning field and events related to adaptors. For security, all control channel 58a, data channel 58b and event notification channel 60a and/or the information flowing there through can be encrypted with, for example, a symmetric encryption algorithm with dynamically generated keys such as Advanced Encryption Standard (AES), DES (Data Encryption Standard) or triple-DES. For Internet traffic, an additional Secured Socket Layer (SSL) protocol can be used between web clients and web servers. Therefore, by now it should also become clear that an end-to-end secured communication, be it among different processes inside the same computer box or across a computer network or the Internet, between the RFID-enabled software applications 90 and the physical RFID device 70 is insured. More illustration on channel security versus types of RFID-enabled software applications 90 will be presented. The just described communication channels 58a, 58b and 60a also suggested that the RFID-enabled application development and deployment system 10 supports two programming paradigms. First, the RFID-enabled application development and deployment system 10 allows client applications to initiate requests by invoking command-APIs 52a supported by the client applications. Second, the RFID-enabled application development and deployment system 10 also supports an event driven programming paradigm wherein the logical RFID devices 50 sends two categories of events, tag events and control events, which are respectively related to RFID tags in an RF scan field and status of an adaptor instance. Applications interested in these events can then register a callback through the callback-APIs 52b or the plug-in services 52c. Hence, respective callbacks or plug-in services will be invoked upon occurrence of events at an associated logical RFID device.

The command-APIs 52a, callback-APIs 52b and plug-in services 52c are all externalized device-independent RFID-enabling APIs 54 embedded within the RFID-enabled software applications 90. The command-APIs 52a, callback-APIs 52b and plug-in services 52c are all externalized high level APIs for desktop, networked and web applications to interact with other parts of the logical RFID devices 50. TCP/IP message transport is used between the command-APIs 52a client and the rest of the logical RFID devices 50. For flexibility of system deployment, the command-APIs 52a support numerous computer programming languages such as C++, C, C#, Visual Basic, Java and JavaScript. Likewise, the callback-APIs 52b also support numerous computer programming languages such as C++, C, C#, and Java. The callback-APIs 52b are implemented within the RFID-enabled software applications 90 as callback registration for events coming from the logical RFID devices 50. Each of the plug-in services 52c is a catcher of events coming from the logical RFID devices 50. The plug-in services 52c are designed for application plug-in registration and invocation. The plug-in services 52c comprise plug-in services for well-known application servers such as WebMethod.

Another conceptual embodiment is that, all the components of the logical RFID devices 50 from the device interface manager 66 at the lowest level to the control channel 58a, the data channel 58b and the event notification channel 60a at the highest level, inclusively, can be thought of as constituting a logical RFID device runtime daemon 56 for communicating with the externalized device-independent RFID-enabling APIs 54 while providing device-dependent interfaces through the device interface manager 66.

Figure 4:
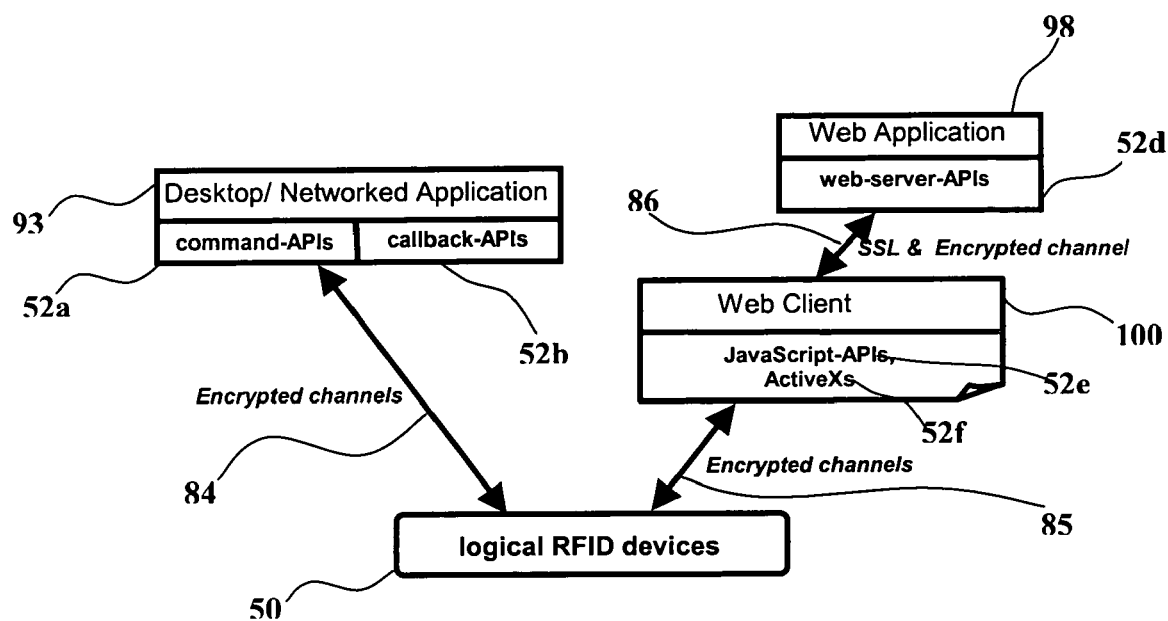
FIG. 4 is another illustration of channel security infrastructure versus types of RFID-enabled software applications 90.

FIG. 4 is another illustration of channel security infrastructure versus types of RFID-enabled software applications 90. To provide secured message exchange between logical RFID devices 50 and any of its client applications, encrypted communication channels are established between the two parties. The RFID-enabled application development and deployment system 10 has slightly different security infrastructure for web application 98 with web-server-APIs 52d, compared with desktop/networked application 93 with command-APIs 52a. For the desktop/networked application 93, the application talks directly to targeted logical RFID devices 50 via its encrypted channels 84. Here, the encryption of information traffic is simply done with command-APIs 52a client residing in this application. However, for the case of web application 98, there are ActiveXs (or web plug-in components) 52f and a set of Javascript-APIs 52e equipped web client 100 sitting between targeted logical RFID devices 50 and the web application 98. The encrypted channels 85 are established between the logical RFID devices 50 and the web client 100. To protect sensitive application data such as authentication keys, applications are encouraged not to expose these sensitive application data on web pages. Instead, these sensitive data are normally hidden at a data store that is accessible by the web application 98 residing on a hosting web server. Hence, message encryption is carried out at the hosting web server where the web application 98 retrieves these data and prepares messages. The encrypted messages are then sent over SSL and encrypted channels 86 to the web client 100 residing within a browser that renders the web pages.

Following a typical deployment of the RFID-enabled application development and deployment system 10, there can be one installed logical RFID device per computer, to which a plurality of physical RFID readers are connected via a corresponding number of generally different device interfaces. For the purpose of scalability, multiple logical RFID Readers can be integrated together. In this embodiment, an Enterprise Reader Manager can be provided to control and monitor all integrated logical RFID readers as well as all connected adaptors and/or physical RFID readers.

Figure 5:
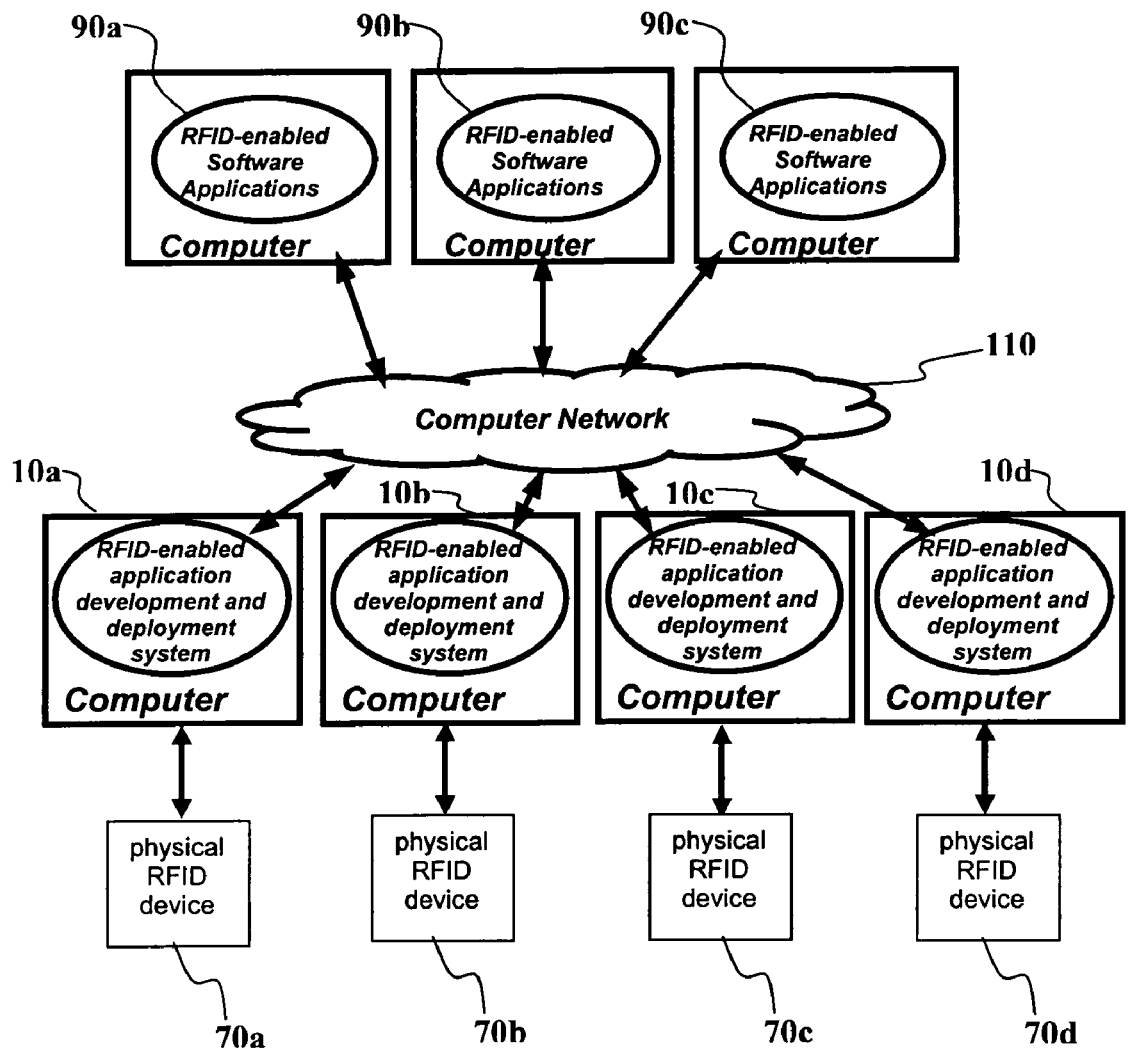
FIG. 5 illustrates an overview of a number of RFID-enabled software applications working with another number of physical RFID devices in a networked computer environment following the deployment of the RFID-enabled application development and deployment system.

FIG. 5 illustrates the corresponding overview of a number of networked RFID-enabled software applications 90a, 90b and 90c, each residing on its own computer. These application-resident computers then interface and work with a number of physical RFID devices 70a, 70b, 70c and 70d through a computer network 110 and another number of computers having the RFID-enabled application development and deployment systems 10a, 10b, 10c and 10d installed in there.

Figure 6:
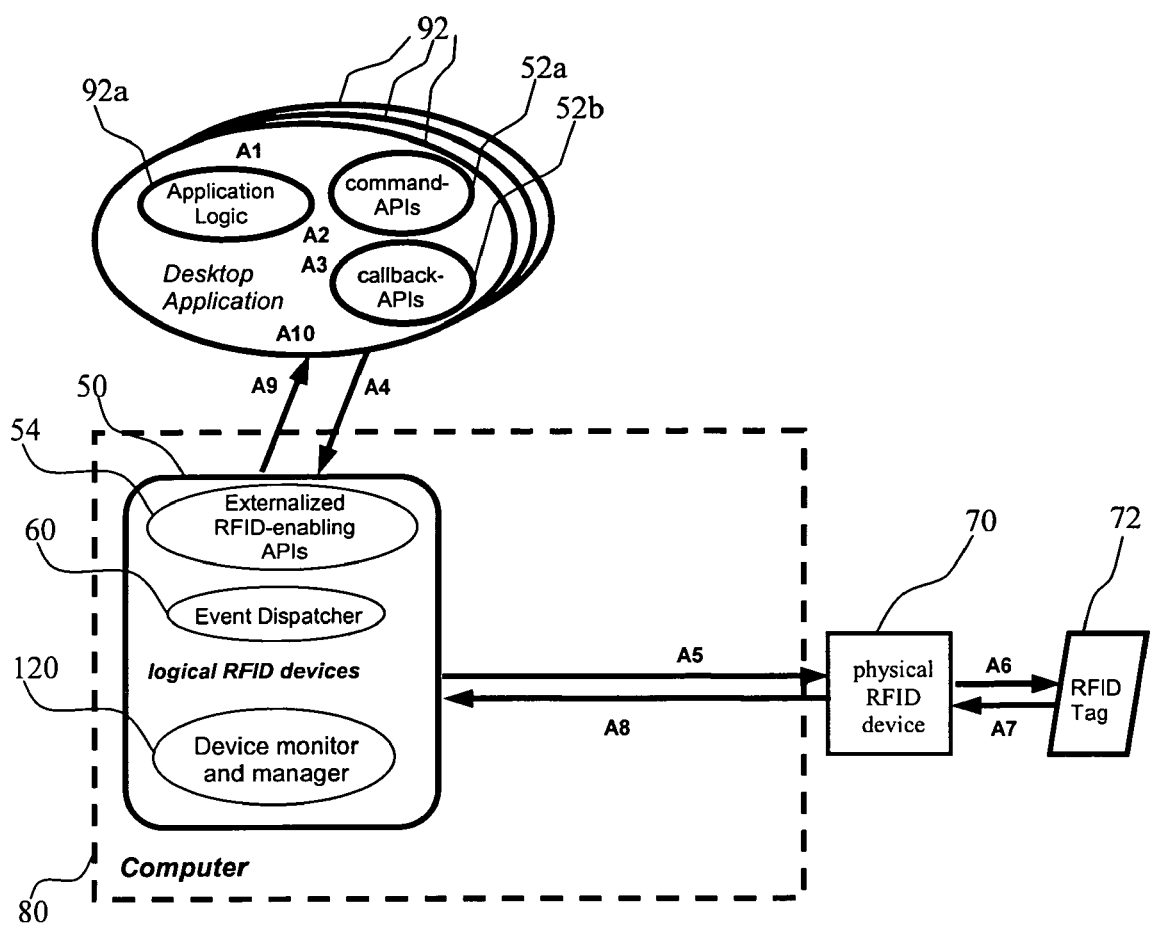
FIG. 6 illustrates data flow and control flow for an RFID-enabled software application with API invocation for desktop applications.

The data flow and control flow among the components of the RFID-enabled application development and deployment system 10, the physical RFID devices and a client application are different for web and non-web related applications. For illustration, data flow and control flow are described for the following three different kinds of RFID-enabled software applications:

Desktop application with API invocation in FIG. 6.
Desktop application with event invocation in FIG. 7.
Web application with API invocation in FIG. 8.

In FIG. 6, RFID-enabled desktop applications 92 refer to applications that reside on the same computer where the targeted logical RFID devices 50 are installed. On the other hand, RFID-enabled networked applications refer to applications that can run on a different computer than the one where the targeted logical RFID devices 50 are installed. Nevertheless, for these two types of RFID-enabled applications, the control flow and data flow among the various related components are the same. For clarity of the embodiment, various steps and control/data flow below are labeled as A1, A2, . . . , A10:

A1: Desktop application 92 invokes an API client from the set of externalized device-independent RFID-enabling APIs 54.

A2: The API client establishes a secured data channel with targeted logical RFID devices 50 if such channel has not already been established before.

A3: The API client encrypts application data if needed, formats an API request with appropriate data and encrypts the API request message using, for example, an AES algorithm with dynamic seed.

A4: The client sends the encrypted message over the established secured data channel to the targeted logical RFID devices 50.

A5: The targeted logical RFID devices 50 send request to an attached physical RFID device 70. This may involve performing several round trips of RF operations between the logical RFID devices 50 and the physical RFID device 70. The RF operations comprise executing anti-collision protocols to select the targeted RFID tag 72 and performing any read/write operations on the targeted RFID tag 72.

A6: The physical RFID device 70 actually communicates with those RFID tags within the RF scan field.

A7: The physical RFID device 70 retrieves data from the RFID tag 72.

A8: The logical RFID devices 50 receive results from the attached physical RFID device 70.

A9: The logical RFID devices 50 format the resulting message, encrypt the resulting message using a symmetric encryption algorithm, such as AES, with dynamic seed, and send the encrypted message over the same secured data channel back to the API client.

A10: The API client decrypts the encrypted message, further decrypts any application data if needed, and returns the results back to the desktop application 92.

Steps A1 to A10 are then repeated whenever an API client is invoked.

Figure 7:
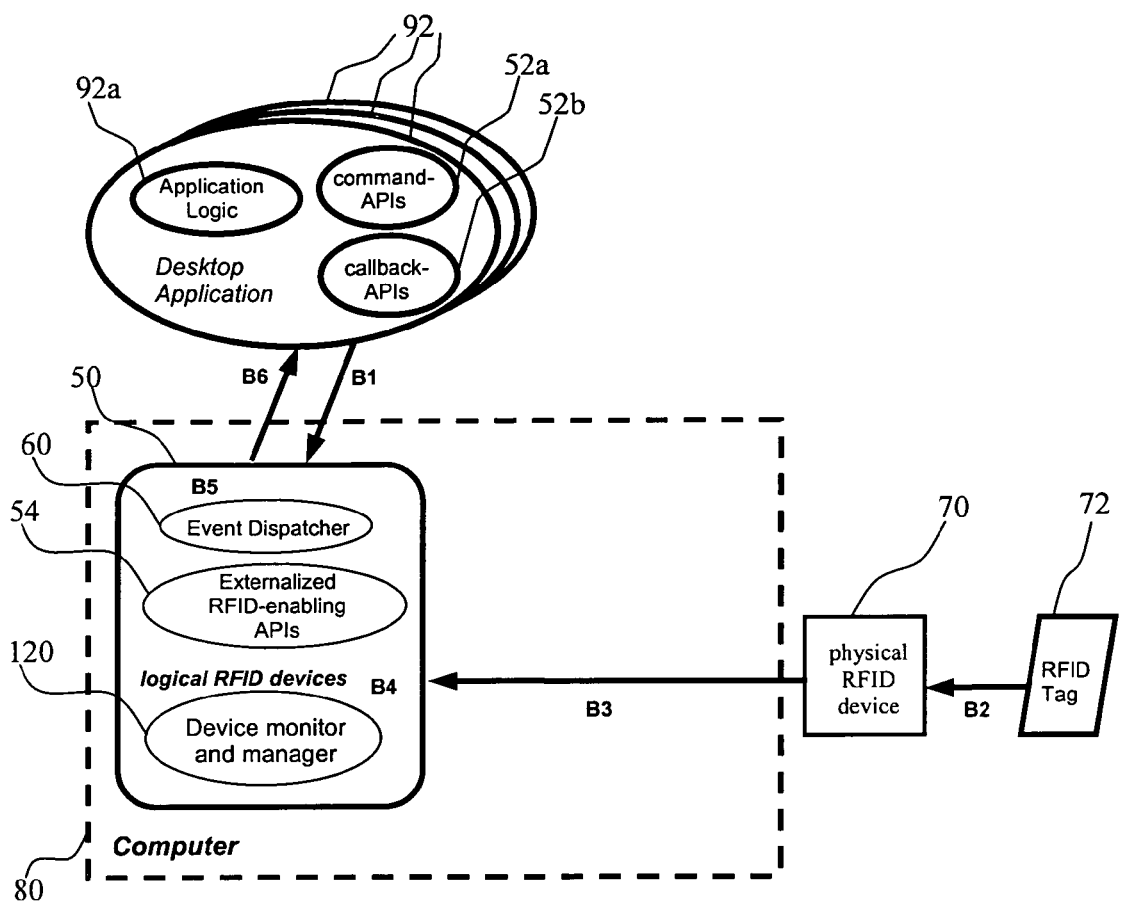
FIG. 7 illustrates data flow and control flow for an RFID-enabled software application with event invocation for desktop applications.

FIG. 7 illustrates data flow and control flow for an RFID-enabled desktop application 92 with event invocation. It is remarked again that the data flow and control flow remain the same for networked applications. However, being different from the above API-driven program flow, the event invocation is triggered with the presence of an RFID tag 72 to a physical RFID device 70. Recall from before that the logical RFID devices 50 send two categories of events: tag events and control events. FIG. 7 presents program flow following a tag event invocation. For clarity of the embodiment, various steps and control/data flow below are labeled as B1, B2, . . . , B6:

B1: The API client first registers a callback and then establishes a secured event channel with targeted logical RFID devices 50, if such channel has not already been established before.

B2: An RFID tag 72 is moved within the RF scanning field of a physical RFID device 70.

B3: Logical RFID devices 50, which have been polling the physical RFID device 70, detect the presence of an RFID tag in the scanning field. The logical RFID devices 50 will read the tag identification and/or tag data.

B4: The logical RFID devices 50 will decide which kind of tag events should be issued according to a predefined configuration and the selected RFID tag.

B5: The logical RFID devices 50 first check that there is no pending same type of tag events with the same tag identification as the issued tag event in the previous step. The logical RFID devices 50 then insert an issued event for the previous step, with the tag identification, into an event queue.

B6: The event dispatcher 60 picks up the first event from the event queue and dispatches the event to all correspondingly established event channels.

However, following a control event invocation the following alternative steps are followed:

B1: The API client first registers a callback and then establishes a secured event channel with targeted logical RFID devices 50, if such channel has not already been established before.

B2: The Status of a connected physical RFID device 70 or its corresponding adaptor instance is changed.

B3: Logical RFID devices 50, which have been monitoring the status of all adaptor instances, detect the change and prepare a corresponding type of control event.

B4: The logical RFID devices 50 first check that there is no pending same type of control events. The logical RFID devices 50 then insert the control event into an event queue.

B5: The event dispatcher 60 picks up the first event from the event queue and dispatches the event to all correspondingly established event channels.

It is remarked that all messages going through an event channel are always initiated by the event dispatcher 60 of logical RFID devices 50. In addition, the event channel needs to be kept alive as the API client could not differentiate between the absence of any event and a dropped event channel. One way to keep an event channel alive is by having the event dispatcher 60 constantly send heartbeat messages through the event channel.

Figure 8:
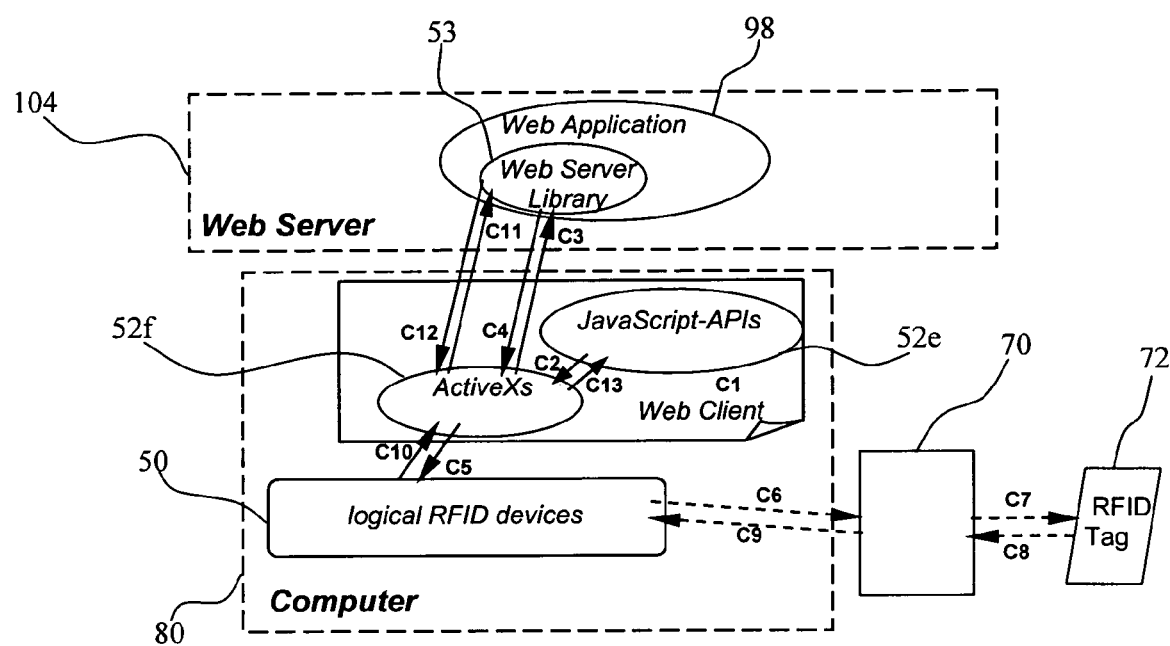
FIG. 8 illustrates data flow and control flow for an RFID-enabled software application with API invocation for web applications.

FIG. 8 illustrates data flow and control flow for an RFID-enabled software application with API invocation for a web application 98. The deployment of the web application 98 generates additional software components: ActiveX components 52f for the case of Microsoft Windows operating system (or, while not illustrated here, a plug-in component for the case of Linux operating system), Web Client APIs and Web Service APIs. The Web Client APIs is a set of JavaScript-APIs 52e for developing RFID-enabled web pages. This set of JavaScript-APIs extends the functionalities from the desktop to the web. However, being different from desktop APIs, sensitive data such as application keys and encryption seeds are not made part of the parameter list of the respective Web Client APIs. Instead, these sensitive data are to be hidden in the corresponding APIs within the Web Service API. The ActiveX components 52f or web plug-in components act, on behalf of a web client page rendered in a web browser, to interact with the installed logical RFID device on the same computer. Meanwhile, the RFID-enabled web application resides on a backend server over the Internet and uses Web Service APIs which are packaged in a Web Server Library 53 that also include services to communicate with Web Client via HTTPS. In practice, the ActiveXs or web plug-in components can be pre-installed at the time the logical RFID reader is installed or it can be downloaded and installed on the fly when an RFID-enabled web page is downloaded. For clarity of the embodiment, various steps and control/data flow below are labeled as C1, C2, . . . , C13:

C1: A user clicks on an HTML control on an RFID-enabled web page of a web application 98 to perform an action that in turn triggers Web Client script APIs written in JavaScript, called JavaScript-APIs 52*e*.

C2: The JavaScript-APIs 52*e* passes a corresponding request to the loaded ActiveXs or web plug-in components in the web browser, called ActiveXs 52*f* in this example.

C3: Based on this request, the ActiveXs 52*f* formats a message and uses HTTPS protocol to send a POST request via the Internet to a servlet that implements Web Service APIs which are part of the Web Server Library 53. This servlet should reside on the same machine that hosts the web application 98.

C4: The servlet processes the POST request and prepares a corresponding API request message for the logical RFID devices 50. This involves the retrieval of related keys and seeds, application data encryption if needed, and message formatting and encryption. The servlet then returns the encrypted request message in the HTTP POST return message to the ActiveXs 52*f*.

C5: The ActiveXs 52*f* forwards this encrypted request message to a logical RFID device 50 residing in the same personal computer.

C6: The logical RFID device 50 processes this request and sends appropriate device-dependent commands to the connected physical RFID device 70. This may involve performing several round trips of RF operations between the logical RFID devices 50 and the physical RFID device 70. The RF operations include executing anti-collision protocols to select the targeted RFID tag 72 and performing any read/write operations on the targeted RFID tag 72.

C7: The physical RFID device 70 then accesses those RFID tags within the RF scan field.

C8: The physical RFID device 70 retrieves information from the RFID tag 72.

C9: The physical RFID device 70 in turn sends the retrieved information to the logical RFID device 50.

C10: The logical RFID device 50 prepares a result message and sends it over the same data channel to the ActiveXs 52*f*. This result message can be encrypted using AES algorithm with dynamic seed.

C11: The ActiveXs 52*f* prepares an HTTP POST request using this result message and then uses an HTTPS protocol to send a corresponding request via the Internet to the same servlet.

C12: The servlet, that implements Web Service APIs, processes the returned result and formats the result into one of the pre-defined XML format. The corresponding Web Service API returns the resulting XML to the ActiveXs 52*f*.

C13: The ActiveXs 52*f* returns the resulting XML back to the invoked JavaScript-APIs 52*e*.

Steps C3 through C11 could be repeated with each Web Client API request. Notice that in FIG. 8 all the solid arrow lines represent secured channels covered by the RFID-enabled application development and deployment system 10. On the other hand, the dotted arrow lines are not within the scope of security service of the RFID-enabled application development and deployment system 10.

A system for efficiently developing and deploying RFID-enabled software applications has been described for securely monitoring and communicating with network-coupled heterogeneous physical RFID devices to access data stored on scanned RFID tags. With respect to the above descriptions, it is to be realized that numerous variations and extensions of the embodiments are deemed readily apparent and obvious to one skilled in the art, and all equivalent relationships to those illustrated in the figures and described in the specification are intended to be encompassed by the present invention. Therefore, the foregoing is considered as illustrative only of the principles of the invention. Furthermore, since numerous modifications and changes will readily occur to those skilled in the art, it is not desired to limit the invention to the exact construction and operation shown and described and accordingly, all suitable modifications and equivalents may be resorted to fall within the scope of the invention.

What is claimed is:

1. A system for developing and deploying a number of individually located Radio Frequency IDentification (RFID)-enabled software applications, capable of securely monitoring a status of and communicating with a number of connected physical RFID devices to access data stored on RFID tags, the system comprising:

an RFID-Software Development Kit (RFID-SDK) comprising a set of externalized RFID-enabling Application Programming Interfaces (APIs) invokable, during run time, by said RFID-enabled software applications for accessing the RFID tag data; and a number of logical RFID devices, each coupled with said RFID-enabled software applications through a selectable subset of said set of externalized RFID-enabling APIs, and coupled with said physical RFID devices through a corresponding set of device-dependent interfaces, each communicating with a matching member of said RFID devices, for securely bridging communication between said RFID-enabled software applications and said physical RFID devices to access the RFID tag data.

2. The system of claim 1 further comprises a device monitor and manager, being a device manager service daemon running in said number of logical RFID devices, for monitoring and controlling said physical RFID devices and said logical RFID devices in real-time.

3. The system of claim 2, wherein said data monitor and manager, coupled to said number of logical RFID devices, is provided for monitoring and managing data flow between said RFID-enabled software applications and said RFID devices.

4. The system of claim 2 wherein said device monitor and manager further comprises a set of externalized device monitoring and controlling commands and APIs for monitoring and controlling said physical RFID devices and said logical RFID devices.

5. The system of claim 3 wherein said data monitor and manager further comprises:

a number of plug-in services and templates as hooks to implement RFID-enabled software application logic for data filtering and aggregation;

a data-flow tracker for keeping a track of the flows of data between said RFID-enabled software applications and all connected physical RFID devices through selected RFID tags within their RF scan fields; and a data-flow analyzer for analyzing data flows between said RFID-enabled software applications and all connected physical RFID devices through selected RFID tags within their RF scan fields for data mining.

6. The system of claim 1 wherein said RFID-SDK further comprises:

an RFID Web Service Kit (RFID-WSK) that further comprising:

a set of APIs for scripting web client pages;

a set of web objects each being a server-resident service; and a set of data objects represented in web page markup languages.

7. The system of claim 1 wherein said RFID-SDK further comprises a set of plug-in components for a web browser.

8. The system of claim 6, wherein said server-resident services further comprises a set of web objects capable of performing one or more of following operations:
   dispatching requests from said web client pages;
   calling plug-in components provided by users to get application specific information for next step operations;
   preparing encrypted request packets to be sent to a web client to get RFID tag data from a client site;
   processing encrypted result packets returned from said web client;
   calling plug-in components provided by users for applying application specific logic to prepare a returned object; and
   returning a final result back to said web client.

9. The system of claim 6 wherein said markup languages are selected from a group consisting of: Extensible Markup Language (XML), HyperText Markup Language (HTML), Standard Generalized Markup Language (SGML), Vector Markup language (VML), Theological Markup Language (ThML) and Virtual Reality Markup Language (VRML).

10. The system of claim 1 wherein said number of logical RFID devices, corresponding RFID-enabled software applications, and corresponding physical RFID devices, reside on one or more different computers.

11. The system of claim 1 wherein said set of externalized RFID-enabling APIs further comprises:
   a number of command-APIs for effecting an interaction between said RFID-enabled software applications and said logical RFID devices;
   a number of callback-APIs, each being a callback registration, for registering events coming from the interior of said logical RFID devices;
   a number of plug-in services, each being a catcher of events coming from the interior of said logical RFID devices, for registering and invocating application plug-ins; and
   a set of application development tools for developing client components invokable, during run time, by said RFID-enabled software applications for accessing the RFID tag data.

12. The system of claim 10, wherein said command-APIs further support a number of computer programming languages.

13. The system of claim 12, wherein said number of computer programming languages are selected from a group consisting of: one or more of the followings: C++, C, C#, Visual Basic, Java, and JavaScript.

14. The system of claim 10, wherein said callback-APIs support a number of computer programming languages.

15. The system of claim 14, wherein said number of computer programming languages are selected from a group consisting of: C++, C, C#, and Java.

16. The system of claim 1 wherein each of said number of logical RFID devices further comprises a logical RFID device runtime daemon for communicating with said subset of RFID-enabling APIs and for providing said device-dependent interfaces.

17. The system of claim 16, wherein said logical RFID device runtime daemon further comprises:
   a command-APIs listener, together with a coupled secured control channel and a coupled secured data channel, for providing bi-directional communication channels and maintaining an information flow between said logical RFID device and each of those RFID-enabling APIs; and
   an event dispatcher, together with an optional, coupled secured event notification channel, for establishing event notification channels and managing an event flow between said logical RFID device and each of those RFID-enabling APIs, thereby insuring end-to-end secured communications between said number of RFID-enabled software applications and said number of physical RFID devices.

18. The system of claim 17, wherein information flowing through said control channel, said data channel and said event notification channel carries operation requests against said RFID tags, responses against said RFID tags and data.

19. The system of claim 17, wherein said control channel, data channel and event notification channel are all secured through data encryption.

20. The system of claim 19, wherein said data encryption is implemented with symmetric encryption algorithms with dynamically or statically generated keys.

21. The system of claim 20, wherein said symmetric encryption algorithms are selected from a group consisting of: Advanced Encryption Standard (AES), DES (Data Encryption Standard), triple-DES, RC2, RC4, RC5, Blowfish, SAFER, SEAL, or WAKE.

22. The system of claim 19, wherein information flowing through said control channel, data channel and event notification channel are further secured through data encryption.

23. The system of claim 22, wherein said data encryption is implemented with symmetric encryption algorithms.

24. The system of claim 23, wherein said symmetric encryption algorithms are selected from a group consisting of: AES, DES, triple-DES, RC2, RC4, RC5, Blow fish, SAFER, SEAL, or WAKE.

25. The system of claim 16, wherein said logical RFID device runtime daemon further comprises a device interface manager for handling and converting device-dependent communication protocols associated with each of said set of device-dependent interfaces into a device-independent interface for controlling and accessing data from said matching member of said RFID devices.

26. The system of claim 25, wherein, for providing said device-dependent interfaces, said logical RFID device runtime daemon further comprises an adaptor manager, coupled with said device interface manager through said device-independent interfaces for concurrently handling operations of all connected physical RFID devices.

27. The system of claim 25, wherein said device-dependent communication protocols comprise either wired or wireless communication protocols.

28. The system of claim 27, wherein said wired and wireless communication protocols are selected from a group consisting of RS232, RS422, USB, Wi-Fi and Bluetooth.

29. The system of claim 26, wherein said adaptor manager further comprises:
   an adaptor-type definer for defining an adaptor type for each kind of said physical RFID devices, according to its unique set of communication attributes and service attributes;
   an adaptor constructor for creating one adaptor instance for each of said connected physical RFID devices;
   an adaptor controller for concurrently monitoring and controlling operational status of all connected physical RFID devices through their respective adaptor instances; and an adaptor cluster for grouping and/or defining a hierarchical structure for a set of adaptor instances according to a set of clustering parameters.

30. The system of claim 17, wherein, through said event notification channels, said event dispatcher sends following categories of events:
   tag events being related to RFID tags in an Radio Frequency (RF) scanning field; and
   control events being related to the status of said adaptor instance.

31. The system of claim 30, wherein said event dispatcher further enables said RFID-enabled software applications to register a callback by invoking said RFID-enabling APIs that is either a callback-API or a plug-in service.

32. The system of claim 29, wherein said control channel carries operation requests and responses against said adaptor instance.

33. The system of claim 29, wherein said set of communication attributes further include a communication protocol and a port number.

34. The system of claim 29, wherein said set of service attributes further include one or more of following parameters related to said logical RFID device runtime daemon:
   a length of each polling cycle to read RFID tag data within an RF scan field;
   a time duration after a last scanned RFID tag for ending a polling cycle;
   a time interval between consecutive polling cycles;
   an anti-collision index of a physical RFID device;
   a data length of each read operation upon a scanned RFID tag; and
   a type of events triggering a polling operation.

35. The system of claim 29, wherein each said control channel further carries operation requests from an originating adaptor instance and carries responses to said originating adaptor instance; and each said data channel further carries RFID tags data corresponding to said operation requests and said responses.

36. The system of claim 29, wherein said adaptor manager further comprises an adaptor cluster for grouping a number of adaptor instances according to a set of clustering parameters.

37. The system of claim 36, wherein said clustering parameters further comprises one or more of: physical proximity of said physical RFID devices, identify of RF scanning fields of said physical RFID devices, location of said physical RFID devices, mission of said physical RFID devices and load balancing of objects being scanned by said physical RFID devices.

38. The system of claim 26, wherein said logical RFID device runtime daemon further comprises a tag data processing manager, coupled with said adaptor manager, said command-APIs listener and said event dispatcher, for filtering the RFID tags data read from each set of grouped adaptor instances by achieving one or more of:
   eliminating duplicated RFID tags data retrieved from the same RFID tag;
   cleaning up unexpected RFID tags data;
   aggregating RFID tags data to fulfill a corresponding requirement from said RFID-enabled software applications; and
   delivering commands and data originated from said RFID-enabled software applications to targeted adaptor instances of said adaptor manager.

39. The system of claim 17, wherein said device monitor and manager further comprises:
   a set of commands and externalized device management APIs for network management against all said connected physical RFID devices; and
   a set of externalized event management APIs for notifying said RFID-enabled software applications of predefined events coming from said physical RFID devices.

40. The system of claim 39, wherein said device management supports existing standard network management protocols used in network management through monitoring said connected physical RFID devices.

41. The system of claim 40, wherein said standard network management protocols include Simple Network Management Protocols (SNMP).

42. The system of claim 3, wherein said data monitor and manager further comprises:
   a set of externalized data access APIs usable by said RFID-enabled software applications for accessing the RFID tags data; and
   a set of externalized data management APIs for filtering and reconciling the RFID tags data from said physical RFID devices before sending a resulting valid data to said RFID-enabled software applications.

43. The system of claim 42, wherein said data monitor and manager further comprises a tag administration tool for initializing inserted new RFID tags and keeping track of the status of all initialized tags.

44. The system of claim 1 wherein said system is implemented on a personal computing machine, an industrial computing machine or an embedded system box containing all software platform functionality as well as computing and networking capability.

45. A method for developing and deploying Radio Frequency IDentification (RFID)-enabled software applications capable of securely monitoring the status of and communicating with a number of connected physical RFID devices to access data stored on RFID tags, the method comprising:
   providing an RFID-Software Development Kit (RFID-SDK) comprising a set of externalized RFID-enabling Application Programming Interfaces (APIs) invokable, during run time, by said RFID-enabled software applications for accessing RFID tag data; and
   providing a number of logical RFID devices, each coupled with said RFID-enabled software applications through a selectable subset of said set of externalized RFID-enabling APIsand coupled with said physical RFID devices through a corresponding set of device-dependent interfaces, each for communicating with a matching member of said RFID devices, for securely bridging the communication between said RFID-enabled software applications and said physical RFID devices to access data stored on said RFID tags.

46. The method of claim 45 further comprising:
   installing a device monitor and manager, being a device manager service daemon, for monitoring and controlling said RFID devices in real-time; and
   installing a data monitor and manager, coupled to said number of logical RFID devices, for monitoring and managing data flow between said RFID-enabled software applications and said RFID devices.

47. The method of claim 46, wherein said step of monitoring and controlling said physical RFID devices and said logical RFID devices further comprising:
   configuring said physical RFID devices and said logical RFID devices;
   performing control operation thereon;

monitoring operation status thereof; and
reviewing operation logs thereof.

48. The method of claim 45, wherein the step of providing an RFID-Software Development Kit (RFID-SDK) for a desktop or networked deployment of said RFID-enabled software applications to securely monitor the status of and access RFID tags data from a targeted physical RFID device, further comprises:
 invoking a RFID-enabling API with a client component of said RFID-enabled software application;
 establishing secured communication with and sending a request message to a correspondingly targeted logical RFID device with the invoked RFID-enabling API;
 sending a request message to the target physical RFID device, being attached to the correspondingly targeted logical RFID device, and accessing data stored on the RFID tag with the correspondingly targeted logical RFID device; and
 returning the accessed data, via the client component of said RFID-enabling API, back to said RFID-enabled software application with the correspondingly targeted logical RFID device.

49. The method of claim 48, wherein establishing secured communication with and sending a request message to a correspondingly targeted logical RFID device further comprises:
 establishing a secured data channel with the correspondingly targeted logical RFID device;
 encrypting application data and e the request message; and
 sending the encrypted request message over the established secured data channel to the correspondingly targeted logical RFID device.

50. The method of claim 48, wherein sending a request message to the target physical RFID device and accessing data stored on the RFID tag further comprises:
 sending a request to the targeted physical RFID device;
 communicating with and accessing data on scanned RFID tags in an RF scan field with the targeted physical RFID device; and
 receiving results from the targeted physical RFID device with the correspondingly targeted logical RFID device.

51. The method of claim 50, wherein sending a request to the targeted physical RFID device further comprises performing a number of round trips of RF operations from the targeted logical RFID device to the targeted physical RFID device.

52. The method of claim 51, wherein performing a number of round trips of RF operations further comprises executing anti-collision protocol to select the inserted RFID tags and performing any required read/write operations on the scanned RFID tags.

53. The method of claim 48, wherein returning the accessed data back to said RFID-enabled software application further comprises:
 formatting a result message containing the accessed data and encrypting the result message;
 sending the encrypted result message over the secured data channel back to the client component;
 decrypting the encrypted result message, and further decrypting any application data if needed; and
 returning the decrypted accessed data back to said RFID-enabled software application.

54. The method of claim 45 wherein, the step of providing an RFID-Software Development Kit (RFID-SDK) for a brower-related web deployment of aid RFID-enabled software applications for the user to securely retrieve a requested document containing RFID tags data in a targeted physical RFID device, further comprises the following steps:
 triggering a web client by clicking on a corresponding markup language control on the web page;
 requesting, with the web client, a web object, residing on a hosting server, to implement web service APIs serving the web client;
 establishing, with the web object, secured communication with and sending a request message to a correspondingly targeted logical RFID device residing on the same computer as a web browser;
 sending a request message to the target physical RFID device, being attached to the correspondingly targeted logical RFID device, and accessing data stored on the RFID tag with the correspondingly targeted logical RFID device; and
 securely returning the requested document containing the accessed RFID tags data to the user.

55. The method of claim 54, wherein requesting a web object to implement web service APIs further comprises:
 passing the request to a loaded plug-in component in the web browser; and
 formatting a corresponding message and sending a POST request to said web object to implement said web service APIs.

56. The method of claim 54, wherein establishing secured communication with and sending a request message to a correspondingly targeted logical RFID device further comprises:
 establishing a secured data channel with the correspondingly targeted logical RFID device;
 processing the POST request of a web protocol and preparing a corresponding API request message;
 encrypting application data if needed, formatting the request message with appropriate data and encrypting the request message; and
 sending the encrypted request message over the established secured data channel to the correspondingly targeted logical RFID device.

57. The method of claim 56, wherein preparing a corresponding API request message further comprises:
 hiding all sensitive data at a data store that is only accessible by said web applications; and
 retrieving said sensitive data from said data store.

58. The method of claim 57, wherein said sensitive data further include tag authentication keys, access control bits and security configuration.

59. The method of claim 57, wherein preparing a corresponding API request message further comprises:
 retrieving related keys and seeds for encryption;
 encrypting application data if needed; and
 formatting and encrypting the API request message.

60. The method of claim 56, wherein sending the encrypted request message to the correspondingly targeted logical RFID device further comprises:
 returning, with the web object, the encrypted API request message in an HTTP POST return message to the plug-in component in the web browser; and
 forwarding, with the plug-in component, the encrypted API request message to the correspondingly targeted logical RFID device.

61. The method of claim 54, wherein sending a request message to the target physical RFID device and accessing data stored on the RFID tag further comprises:
 sending a request to the targeted physical RFID device;

communicating with and accessing data on inserted RFID tags in an RF scan field with the targeted physical RFID device; and receiving results from the targeted physical RFID device with the correspondingly targeted logical RFID device.

62. The method of claim 61, wherein sending a request to the targeted physical RFID device further comprises performing a number of round trips of RF operations from the targeted logical RFID device to the targeted physical RFID device.

63. The method of claim 62, wherein performing a number of round trips of RF operations further comprises:

executing anti-collision protocol to select the inserted RFID tags; and performing any required read/write operations on the inserted RFID tags.

64. The method of claim 56, wherein securely returning the requested document containing the accessed RFID tags data to the user further comprises:

formatting and encrypting a result message containing the accessed data;

sending the encrypted result message over the secured data channel to a loaded plug-in component in the web browser;

decrypting the encrypted result message, and sending a corresponding HTTP POST request over the Internet to the web object;

processing the result message to one of the existing web markup language formats and returning the resulting requested document to the loaded plug-in component; and returning the requested document back to the user via the triggered web client.

65. The method of claim 48 further comprises the step of handling a tag event for the presenting of an RFID tag within the RF scan field of one of said physical RFID devices.

66. The method of claim 65 further comprises the steps of:

polling said one physical RFID device and detecting the tag event with a targeted logical RFID device coupled with said one physical RFID device; and issuing the tag event to an event queue with the targeted logical RFID device.

67. The method of claim 66 further comprises the steps of:

registering a callback with a client component and, if an event notification channel has not already been established for the targeted logical RFID device, establishing said event notification channel; and picking up the first event in the event queue and dispatching the picked up event to all correspondingly established event notification channels with an event dispatcher of said targeted logical RFID device.

68. The method of claim 66, wherein issuing the tag event to an event queue further comprises:

reading the tag identification and/or tag data of the detected tag event;

qualifying the detected tag event according to predefined conditions; and inserting the qualified tag event with its tag identification to an event queue.

69. The method of claim 48 further comprises the step of handling a control event defined as the status change of a connected physical RFID device or its corresponding adaptor instance.

70. The method of claim 69 further comprises monitoring the status of all adaptor instances, detecting any status change and preparing a corresponding control event.

71. The method of claim 70 further comprises issuing the control event, upon its qualification, to an event queue with a targeted logical RFID device.

72. The method of claim 70 further comprises registering a callback with a client component and, if an event notification channel has not already been established for the targeted logical RFID device, establishing said event notification channel.

73. The method of claim 72 further comprises picking up the first event in the event queue and dispatching the picked up event to all correspondingly established event notification channels with an event dispatcher of said targeted logical RFID device.

74. The method of claim 71, wherein issuing the control event to an event queue further comprises:

qualifying the detected control event according to the absence of pending previously detected duplicate control event; and inserting the thus qualified control event to an event queue.

* * * * *